United States Patent [19]

Chabria

[11] 4,262,848
[45] Apr. 21, 1981

[54] GUN FOR IN SITU FORMATION OF FOAM IN PACKAGES

[76] Inventor: Paul R. Chabria, 3 N. 735 Locust, West Chicago, Ill. 60185

[21] Appl. No.: 137,801

[22] Filed: Apr. 7, 1980

Related U.S. Application Data

[62] Division of Ser. No. 859,553, Dec. 12, 1977.

[51] Int. Cl.$^3$ .......................... B05B 7/08; B05B 15/02
[52] U.S. Cl. ..................................... 239/112; 239/391; 239/416.1; 239/417.5; 239/419.3; 239/422
[58] Field of Search ............... 239/112, 113, 390, 391, 239/414, 416.1, 417.5, 419, 419.3, 422, 423, 527, 543, 544

[56] References Cited

U.S. PATENT DOCUMENTS

| 490,956 | 1/1893 | Franzen | 239/391 X |
|---|---|---|---|
| 2,584,178 | 2/1952 | Abbott et al. | 239/418 X |
| 3,375,978 | 4/1968 | Rennie | 239/416.1 X |

Primary Examiner—Andres Kashnikow
Attorney, Agent, or Firm—Darbo & Vandenburgh

[57] ABSTRACT

Foam forming liquid components and inert gas are directed by a gun in separate and discrete streams toward a common focal point just forward of the gun nozzle to effect mixing of the liquid components in space as the foaming plastic mass is directed into a container provided to receive and contain the foam product. Mixing of the liquid components within the gun which controls the flow is entirely avoided whereby the difficult problem of cleaning out reacted plastic material is entirely avoided even after long periods of non-use. In one technique, air is continuously mixed with each liquid component stream within the gun to provide frothy mixtures of liquid and air at the point of mixing of the reacting streams. A flexible extension of the nozzle may be used, if desired, to conduct the component liquids and air to a location some distance forwardly of the gun. Provision is made for air-purging the liquid component channels within the gun nozzle.

9 Claims, 13 Drawing Figures

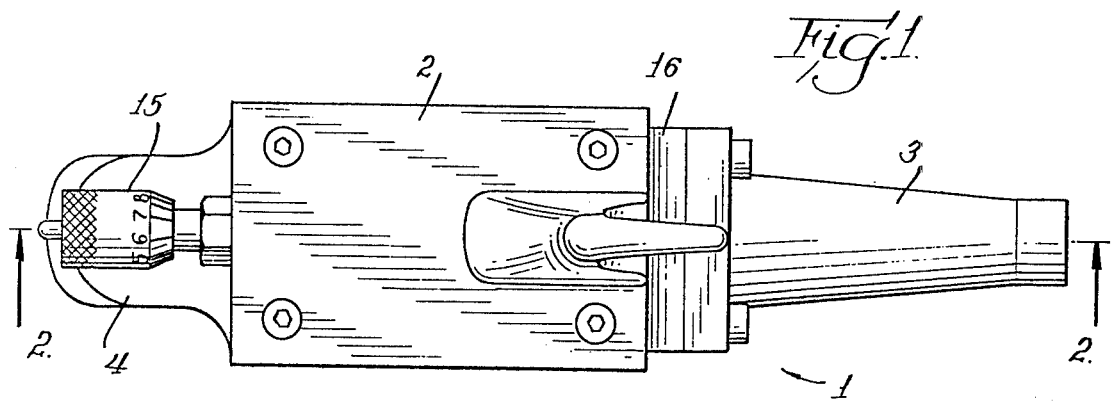
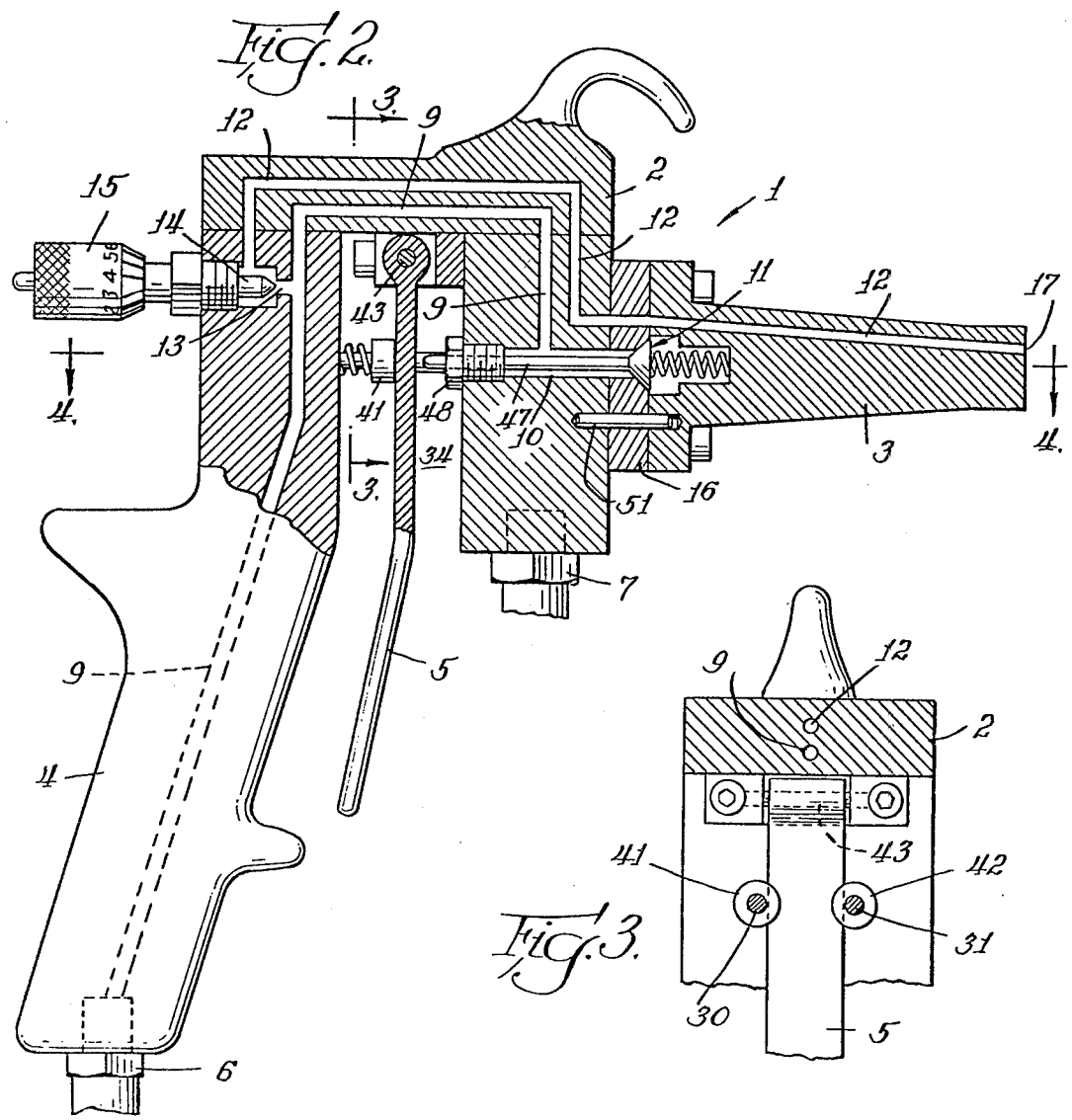

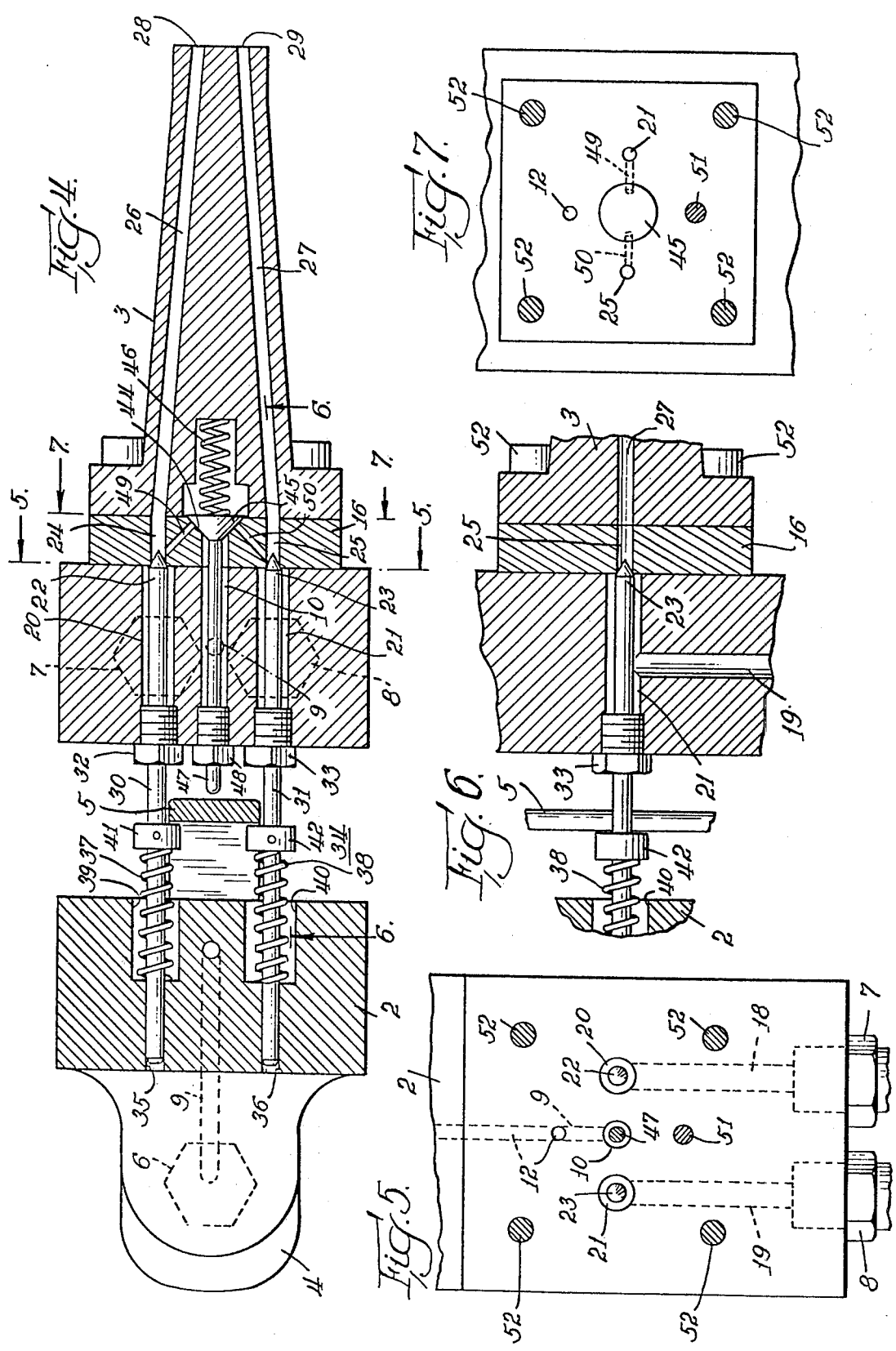

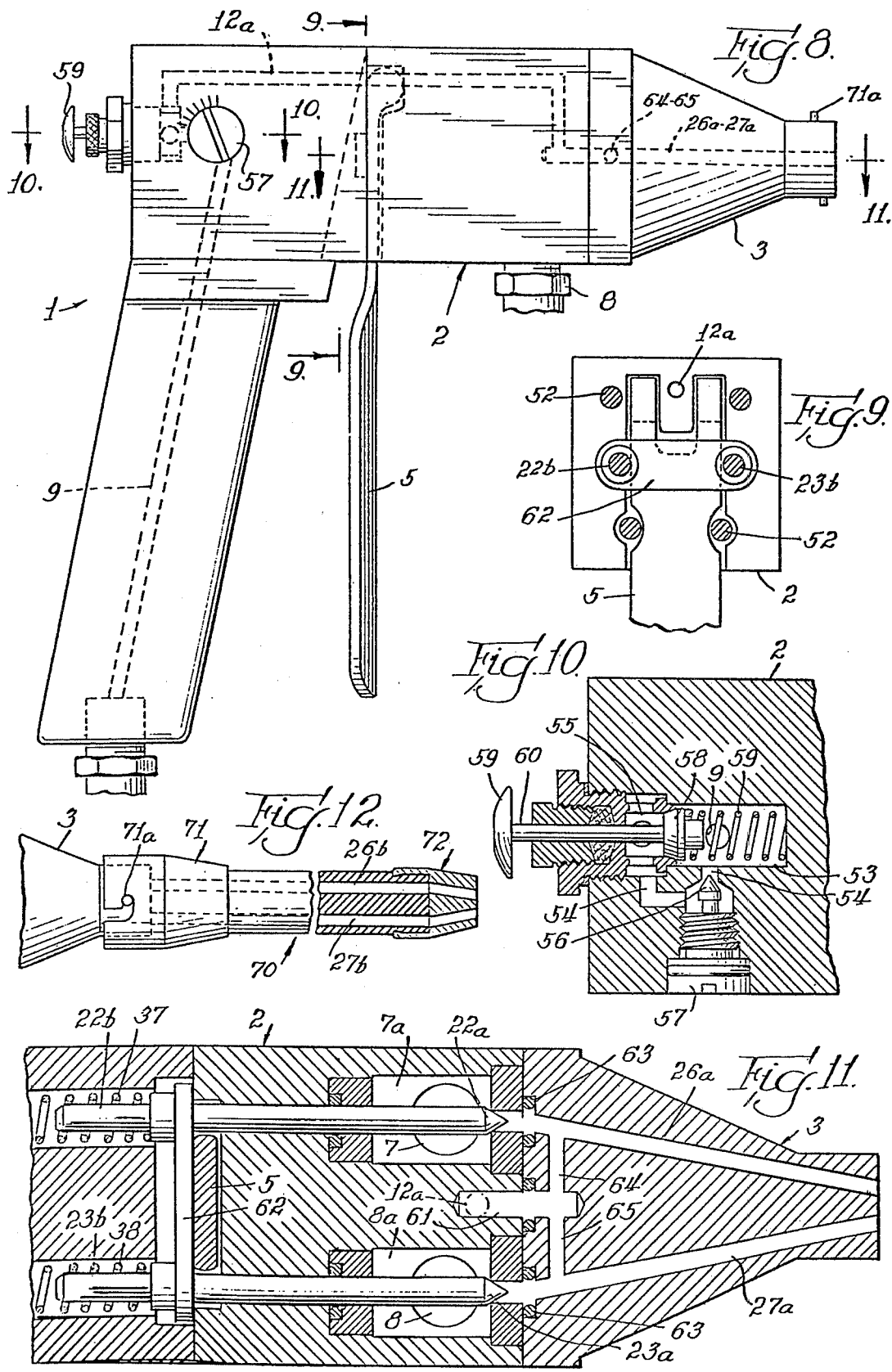

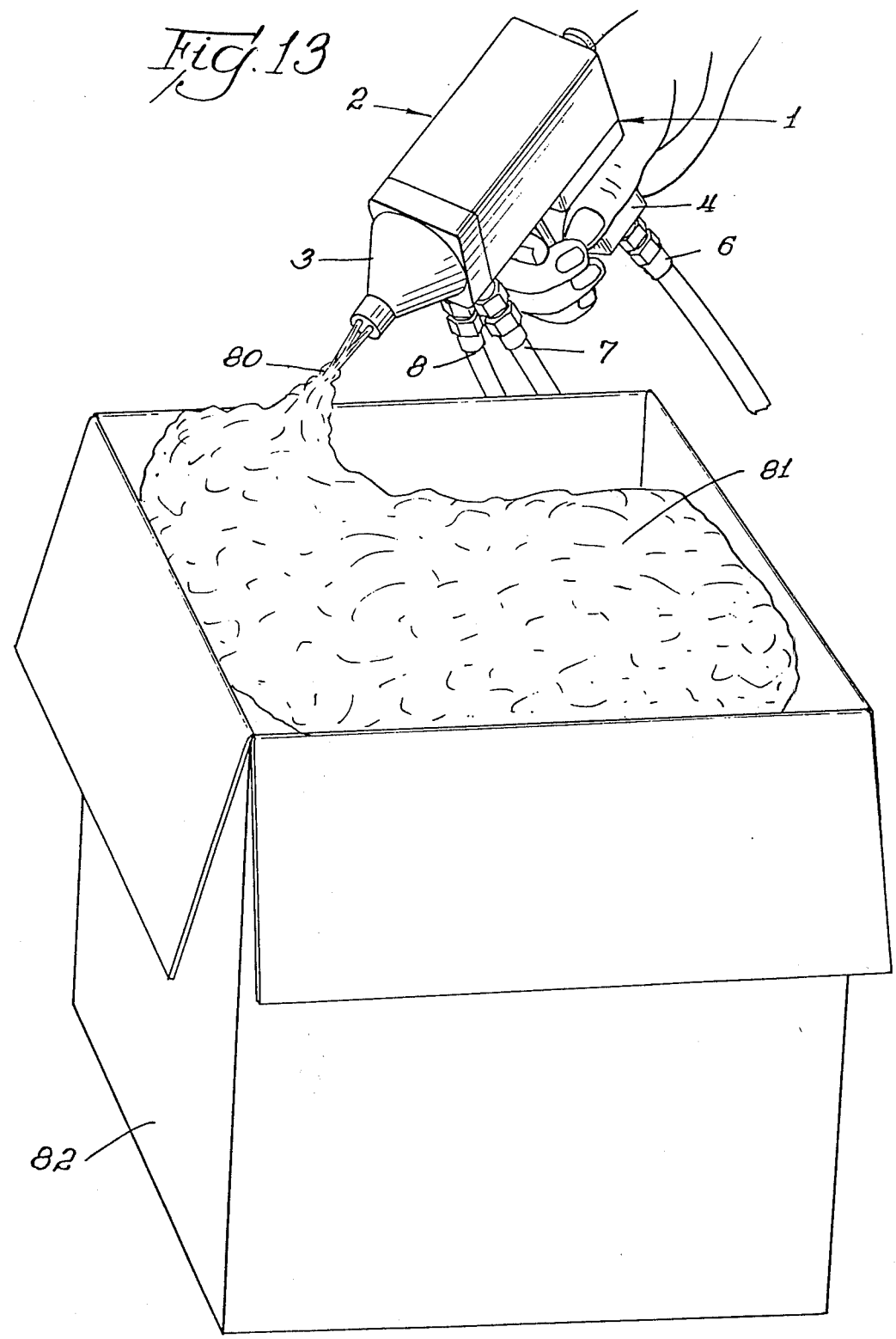

GUN FOR IN SITU FORMATION OF FOAM IN PACKAGES

This is a division of application Ser. No. 859,553, filed Dec. 12, 1977.

BACKGROUND AND SUMMARY OF THE INVENTION

Foams of a variety of plastic materials, densities and other physical characteristics have long been used for a wide variety of purposes, including structural fillers, thermal insulation, and as forms or cushions in packaging. In the packaging field, rigid polystyrene foam may be pre-cast or otherwise formed to receive and cradle for protection products which might otherwise be damaged in transporting them from place to place. In modern packaging, the supporting foam is formed in situ between the articles to be protected and an outer container such as a corrugated box. Plastic foams used in this way take the place of such packing materials as excelsior, corrugated paper products and a variety of formless packing materials. In general, the use of plastic foams reduce labor and material costs and save weight to thereby save transportation costs.

The instant invention is particularly concerned with the provision of plastic foam bodies formed in situ from liquid component materials which, when mixed together, generate a foam which after a short interval becomes a stable, semi-rigid and somewhat flexible foam body. Depending upon the nature of the chemical materials, one of the liquid components may be essentially a catalyst as in the formation of polyurethane foam.

In this packaging system as presently employed, the liquid components are supplied under pressure to a control gun which is equipped with valves which control the flow of the liquids to a mixing chamber to which air or other inert gas is also directed so that the components are mixed to initiate the foaming action. The mixture is then propelled through the gun's nozzle by the compressed air and directed to the container. When the amount supplied is sufficient to fill the container when the foaming action is complete, the flow of the liquid components is stopped by manipulating the valves in the gun, usually by means of a trigger. The process may then be repeated to fill another container. Usually provision is made to blow out as much as possible of the mixture to minimize the amount left inside of the gun to set and require removal by mechanical and/or solvent means. Special cleaning procedures are usually required when the gun is to be laid aside for a long period of time.

Many attempts have been made to minimize the problem of keeping these guns clean of reacted plastic material to avoid interference with its proper operation. In general, the problem has been attacked by minimizing the size of the reaction chamber and making it more accessible for cleaning.

The object of the present invention is to provide a new method and novel gun for effecting the mixing of liquid components in the in situ formation of foam. More specifically, the invention provides means for bringing the liquid components together at a point in space forwardly of the gun, preferably but not necessarily along with a continuous supply of air or other inert gas at which point foaming reaction is initiated and the plastic foaming mixture is propelled in the direction in which the gun is aimed to place the foam in the desired locations, e.g., within a container. Because the liquid components are not brought together in any way within the body of the gun, the problem of keeping the gun passages free of reacted plastic material is entirely obviated.

Another object is to provide a flexible extension of the liquid component and air channels forwardly from the nozzle of the gun to permit direction of the foam stream more accurately into otherwise hard-to-reach places.

A further object is to provide means for air-purging the liquid component channels to even further minimize maintenance cleaning of the gun after use.

Further objects and the achievements of this invention will appear as the description thereof proceeds.

BRIEF DESCRIPTION OF THE DRAWINGS

In the accompanying drawings, one embodiment of the invention is illustrated in FIGS. 1-7 and a second embodiment is illustrated in FIGS. 8-11.

FIG. 1 is a top view of a foam-forming gun embodying the invention;

FIG. 2 is a cross-sectional view taken at the line 2—2 of FIG. 1;

FIG. 3 is a detail view in cross section taken at the line 3—3 of FIG. 2;

FIG. 4 is a cross-sectional view taken at the line 4—4 of FIG. 2;

FIGS. 5, 6 and 7 are detail views in cross section taken, respectively, at the lines 5—5, 6—6 and 7—7 of FIG. 4;

FIG. 8 is a side elevational view of a foam-forming gun illustrating a second embodiment of the invention;

FIGS. 9, 10 and 11 are detail views in cross section taken, respectively, at the lines 9—9, 10—10 and 11—11 of FIG. 8;

FIG. 12 is a detail view, partly in section, showing an optional flexible extension of the nozzle of the gun; and FIG. 13 is a perspective view showing the general relationship of the gun to the container in the use of the gun.

DESCRIPTION OF EXAMPLES EMBODYING BEST MODE OF THE INVENTION

The improved mechanism of this invention is embodied in the heretofore generally used valve control unit in the form of a gun having a barrel for directing the stream of foam or foaming material issuing from the gun, a handle for holding the gun, and a trigger for opening the closing the valves which control the flow of the foam-forming liquid components. The parts of the novel features of the instant invention will be described in detail with only general reference to old and well-known structure. Two of the possible embodiments of the inventive concept, representing the best modes of use of the inventive concept presently known by the inventor, are described and illustrated.

FIRST EMBODIMENT

The foam-forming gun illustrated in FIGS. 1-7 of the drawings comprises a barrel 1 including a body 2 and nozzle 3, a grip or handle 4 and a trigger 5. An inlet connection 6 is provided at the bottom of the handle to continuously supply compressed air to the gun and inlet connections 7 and 8 are provided for the continuous supply of the two liquid foam-forming components to the gun under continuous pressure usually applied to the respective liquid containers.

An air supply channel 9 passes through handle 4 from inlet connection 6, through body 2, and opens into an air chamber 10 which is normally closed by valve 11. A sidebranch air channel 12 takes off from air supply channel 9 at 13 and the rate of air flow through channel 12 is controlled by adjustable needle valve 14 which has a handle 15. In the gun assembly, air channel 12 continues through valve plate 16 and into and through nozzle 3, ending at the air stream outlet orifice 17.

As is best seen in FIGS. 4-6, the foam-forming liquid component materials are conducted into the body 2 of the gun through inlet connections 7 and 8 and respective conduits 18 and 19. These conduits open into valve chambers 20 and 21, respectively, from which the liquid materials can flow only as controlled by needle valves 22 and 23. Liquid component channels 24 and 25 continue downstream from valves 22 and 23, respectively, pass through valve plate 16, and connect with nozzle channels 26 and 27 which open at outlet orifices 28 and 29.

The valves 22 and 23 are controlled by valve stems 30 and 31 which pass through packing glands 32 and 33, space 34, and into slide bores 35 and 36 wherein the valve stems are supported. Compression springs 37 and 38 extend into counterbores 39 and 40 and bear against stops 41 and 42 on the respective valve stems to urge the valves continuously toward closed position at which there is no flow of the foam-forming liquid components through the gun. The valves are simultaneously operated by means of trigger 5 which is fulcrumed at 43 and engages both stops 41 and 42 as is seen in FIG. 4.

Air chamber 10 extends forwardly into valve plate 16 and terminates at valve seat 44. This air outlet is controlled by a valve 45 which is urged by spring 46 to normally closed position. The valve is controlled by valve stem 47 which passes through gland 48 and ends just short of trigger 5 when the latter is at rest at the closed position of valves 22 and 23. Forward movement of trigger 5 opens air valve 45 by engaging and sliding inwardly valve stem 47 against the force of spring 46. When this valve is open, air is supplied to and flows through channels 49 and 50 for purposes to be hereinafter explained.

In accordance with the invention, the three channels, air channel 12 and liquid component channels 26 and 27, which extend through nozzle 3 converge toward each other, their directions being such that if extended they would meet at a single point forwardly of the end of nozzle 3. The channels are open and unimpeded so that the liquid streams issuing from the nozzle into space are essentially discrete continuations of the liquid streams flowing through the channels. Nozzle 3 and valve plate 16 are oriented with respect to each other and to body 2 of the gun by means of a pin 51 which is permanently fixed in the block of the gun. The nozzle and valve plate are fastened securely together and to the block by means of allen screws or bolts 52.

To operate the gun, a source of compressed air is connected to inlet connection 6 and the sources of the two liquid foam-forming components, under continuous pressure, are connected, respectively, to the inlet connections 7 and 8. Air valve 14 is adjusted, based on experience, to the flow rate which produces a continuous air stream to effect maximum mixing of the liquid foam-forming components and provides a continuous stream of foaming chemicals from the gun. Flow of the liquid components is then initiated by pulling on the trigger as the gun is pointed toward the intended location of the foam. The general relationship of the gun and a container as foam is being formed and directed into the container is shown in FIG. 13. The discrete liquid streams converge at a point 80 in space at which interreaction is initiated and the resulting foam 81 has been directed into container 82. When sufficient foam has been supplied, the container is closed.

Usually a limited quantity of foam is first delivered to the bottom of an empty box. As the foam expands, a sheet of polyethylene, or similar film, is placed over the foam and the article to be packed in the box is then placed on the film as the foam continues to rise. Another sheet of the film is then placed over the article, additional foam is directed over this film, and the carton is closed as the foam is setting up. The amount of foam is, of course, controlled by the trigger which permits or prevents the passage of the liquid components through the gun, the air stream flowing continuously.

When packaging operations are to be discontinued for a substantial period of time, the component liquids may be blown out of the channels downstream from valves 22 and 23 by pressing trigger 5 forwardly to open air valve 45 and permit air to flow at relatively high velocities through channels 49 and 50 and into air channels 24 and 25 immediately downstream from valves 22 and 23. Cleaning of the channels beyond such air purging is usually not necessary.

SECOND EMBODIMENT

Both embodiments of the invention herein described as examples of the improved foam-forming gun effect the mixing of the foam-forming liquid components exteriorly of the gun; that is, forwardly of the nozzle as and after the converging streams meet. The first embodiment, above described, provides a stream of air, separate from the streams of component liquids, converging with the liquids at the mixing point forwardly of the nozzle. The embodiment now to be described provides, instead, continuous streams of air into the respective liquid component channels forwardly of their control valves and within the nozzle of the gun so that only two streams, each comprising a somewhat frothy liquid/air mixture, issue from the nozzle to mix together beginning at the point of convergence of the two streams.

In describing the second embodiment, the same numerals will be employed to designate parts which are essentially the same as those of the first embodiment.

A single air channel 12a conducts air from air supply channel 9. The flow of air is controlled by a pair of valves (FIG. 10) arranged in parallel at the juncture of channels 9 and 12a. Channel 9 opens into a well 53 in body 2 of the gun. A sidebranch channel 54 connects well 53 with air chamber 55, the flow of air through sidebranch channel 54 being controlled by an adjustable needle valve 56 having an externally accessible head 57. A second valve 58 controls a second outlet from well 53, this valve being kept normally closed by a compression spring 59 operating in well 53 and being opened by manual pressure applied to head 59 of valve stem 60.

Air channel 12a is connected with air chamber 55 at its inlet end and an air chamber 61 (FIG. 11) at its outlet end, opening into this chamber from the top as indicated by the dot-dash lines.

The foam-forming liquid components are supplied to the gun through inlets 7 and 8, flowing under pressure into valve chambers 7a and 8a (FIG. 11), flow of the liquid from these chambers into nozzle channels 26a and 27a being controlled by valves 22a and 23a. These needle valves are controlled by trigger 5 which, through cross bar 62, engages valve stems 22b and 23b. Compression spring 37 and 38 urge the valves toward closed position.

Nozzle 3 is secured to the body of the gun by suitable means such as allen screws 52, the air and liquid channels being aligned and sealingly connected by O-rings 63. As will be seen in FIG. 11, air chamber 61 is connected with nozzle channels 26a and 27a through channels 64 and 65, respectively.

In operating the gun of this second embodiment, the same connections of air and liquid foam-forming components are made. As in the first embodiment, the air, once connected, flows continuously through the entire air channel system within the gun, including flow through channels 64 and 65 and thence through nozzle channels 26a and 27a. When the operator is ready to place foam in a shipping container or other location, the simultaneous flow of the two liquid components is initiated by pulling on trigger 5 which opens valves 22a and 23a and permits the liquids, which are under continuing pressure, to flow into channels 26a and 27a, mixing with the air also continuously flowing into the nozzle channels from channels 64 and 65. The frothy air/liquid mixtures are then projected from the nozzle of the gun in converging streams as directed by channels 26a and 27a to mix together to form the foam in the shipping container.

When a sufficient amount of foam is in place, the operator releases the trigger to stop the flow of the liquid foam-forming components. By pressing on head 59 of valve stem 60, air is introduced into channel 12a at high velocity to purge channels 26a and 27a downstream from valves 22a and 23a of virtually all liquid material.

It is sometimes necessary to place the plastic foam in places that cannot be served directly by the gun. To handle such problems, a flexible nozzle extending attachment 70 may be employed. This extension comprises an inlet end connector 71 which may be attached to the front end of the gun nozzle by means of a bayonet joint fastening to pins 71a. The attachment terminates with nozzle 72. Channels 26b and 27b connect with nozzle channels 26a and 27a and lead into converging terminal portions of the channels in nozzle 72 so that the streams issuing from these channels converge to a point at which the component materials are mixed to form the foam.

A flexible nozzle extension, such as attachment 70, can be used with the gun of either embodiment of the invention. For use with the second embodiment, only the two channels are required in the flexible hose body of the attachment while three channels are required for use with the gun of the first embodiment. As will be noted in FIG. 8, the attachment pins 71a are located asymmetrically to ensure the proper connection of the attachment to the nozzle.

ACHIEVEMENT

The new method and gun for in situ formation of plastic foam in packaging and for other purposes entirely avoids the long-standing problem in the use of such guns of keeping them clean, substantially free of deposits of reacted foam in the channels and spaces within the gun. The novelty in the technique resides essentially in the complete avoidance of mixing of the liquid foam-forming components within the gun, the mixing which initiates reaction and foam formation taking place outside of the gun, forwardly of the nozzle at a point at which the liquids are first brought together and mixed.

The gun designed to carry out this improved method directs the streams of foam-forming components, along with mixing and propelling air, to a point forwardly of the gun which then becomes the source of a stream of foaming plastic material which is directed toward its intended placement location. In one embodiment of the invention, air is continuously mixed with each stream of liquid component as it passes through the gun to provide frothy mixtures of liquid and air to the point at which they readily mix and react to produce the foam.

To meet special problems in directing foam to hard-to-reach places, a flexible extension of the nozzle of the gun is provided. The possibility of use of such a flexible extension is at least in part made possible by reason of the avoidance of mixing of the liquid foam-forming components within the gun.

Means are provided for air-purging virtually all liquid from the channels within the gun to further minimize gun maintenance problems.

I claim:

1. In a gun for the in situ formation of plastic foam, said gun having separate foam-forming liquid flow channels, valves arranged to control the flow of liquid through said channels, means for manipulating said valves, a nozzle at the forward extremity of said gun, and means for air-purging said channels downstream from said valves, the improvement comprising nozzle channels extending through said nozzle and respectively connecting with said respective liquid flow channels downstream from said valves, said nozzle channels opening to the atmosphere at the forward ends thereof being so formed and converging within said nozzle that streams issue therefrom as discrete streams which intersect at a point in space exteriorly and forwardly of said gun to mix and initiate reaction at said point and thereafter continue forward flow as a reacting stream.

2. A gun in accordance with claim 1 and including an air flow channel through said gun and opening to the atmosphere at the forward end of the nozzle thereof, at least the terminal portion of said air flow channel converging to direct a stream of air issuing therefrom to the point at which the liquid streams intersect whereby to mix with the liquids and join therewith in forwardly propelling the resulting stream of reacting foam-forming liquids.

3. A gun in accordance with claim 2 and including a flexible extension of the nozzle thereof, said extension having channels therethrough connecting respectively at their inlet ends with the respective liquid and air flow nozzle channels and at their outlet ends with an auxiliary nozzle having converging channels like the channels of said gun nozzle, the tubular portion of said extension connecting the inlet thereof with said auxiliary nozzle being flexible.

4. A gun in accordance with claim 2 and including a valve in the air flow channel for adjusting the rate of flow therethrough.

5. A gun in accordance with claim 2 wherein the means for air-purging the channels comprises a second air flow channel within said gun, said second channel connecting at its inlet end to the first-mentioned air flow channel and opening at its outlet end into an air chamber, purge channels leading respectively from said air chamber to the respective liquid flow channels downstream from the valves therein, and an air purge valve at the juncture of said purge channels with said air chamber operable from outside said gun for permitting the flow of air into and through the liquid flow and nozzle channels to purge the same of liquid.

6. A gun in accordance with claim 1 and including an air flow channel leading into said gun and opening through branches at its outlet end into the respective liquid flow channels downstream from the valves therein to provide for the continuous supply of air to the liquids flowing through said liquid flow and nozzle channels.

7. A gun in accordance with claim 6 and including a valve in the air flow channel for adjusting the rate of flow therethrough.

8. A gun in accordance with claim 7 wherein the means for air-purging the channels comprises a shunt channel connected with said air flow channel around the valve therein, and an air purge valve in said shunt channel operable from outside said gun for permitting the flow of air at purging velocity into and through the liquid flow and nozzle channels to purge the same of liquid.

9. A gun in accordance with claim 6 and including a flexible extension of the nozzle thereof, said extension having channels therethrough connecting respectively at their inlet ends with the respective nozzle channels and at their outlet ends with an auxiliary nozzle having converging channels like the channels of said gun nozzle, the tubular portion of said extension connecting the inlet thereof with said auxiliary nozzle being flexible.

* * * * *